United States Patent
Dwivedi et al.

(10) Patent No.: US 12,304,533 B1
(45) Date of Patent: May 20, 2025

(54) REMOVAL AND REPLACEMENT OF CONTAINER SHUTTLES FROM RAIL TRACKS

(71) Applicant: Amazon Technologies, Inc., Seattle, WA (US)

(72) Inventors: Rajeev Dwivedi, Sammamish, WA (US); Michael Alan Bray, Elkhorn, NE (US); Ganesh Krishnamoorthy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 948 days.

(21) Appl. No.: 17/329,950

(22) Filed: May 25, 2021

(51) Int. Cl.
| | |
|---|---|
| *B61B 13/12* | (2006.01) |
| *B60L 13/03* | (2006.01) |
| *B65G 1/06* | (2006.01) |
| *B65G 54/02* | (2006.01) |
| *B61J 1/08* | (2006.01) |
| *B65G 1/137* | (2006.01) |

(52) U.S. Cl.
CPC .............. *B61B 13/12* (2013.01); *B60L 13/03* (2013.01); *B60L 13/035* (2013.01); *B65G 1/065* (2013.01); *B65G 54/02* (2013.01); *B61J 1/08* (2013.01); *B65G 1/1373* (2013.01)

(58) Field of Classification Search
CPC ...... B61B 13/12; B65G 1/1373; B65G 1/065; B65G 54/02; B60L 13/03; B60L 13/035; B61J 1/08
USPC ....... 104/165, 127–129, 290, 292, 293, 283, 104/284
See application file for complete search history.

(56) References Cited

U.S. PATENT DOCUMENTS

| | | | | |
|---|---|---|---|---|
| 317,136 | A * | 5/1885 | Jenkins .................. | B66B 17/16 414/654 |
| 2010/0236445 | A1* | 9/2010 | King ...................... | B60L 13/10 104/130.03 |
| 2016/0052716 | A1* | 2/2016 | Schnabl ................. | B65G 1/065 414/273 |
| 2019/0077277 | A1* | 3/2019 | Holzleitner ........... | H02P 25/064 |

FOREIGN PATENT DOCUMENTS

| | | | | |
|---|---|---|---|---|
| WO | WO-2016146744 A1 * | 9/2016 | ........... | B65G 17/002 |
| WO | WO-2019129396 A1 * | 7/2019 | ............ | B65B 43/00 |

* cited by examiner

*Primary Examiner* — S. Joseph Morano
*Assistant Examiner* — James William Jones
(74) *Attorney, Agent, or Firm* — Eversheds Sutherland (US) LLP

(57) ABSTRACT

Systems and methods are disclosed for removal and replacement of container shuttles from rail tracks. An example system for a shuttle coupled to a permanent magnet may include a track comprising a first rail segment and a second rail segment. The system may include an electromagnet disposed along the track, where the permanent magnet is separated from the electromagnet by a first vertical distance when the shuttle is coupled to the track. The system may include a first ramp comprising a first angled portion and a first flat portion, and a second ramp comprising a second angled portion and a second flat portion, the ramps configured to be removably coupled to the track. A vertical distance between the permanent magnet and the electromagnet may be equal to or greater than the first vertical distance as the shuttle moves upwards along the ramps.

20 Claims, 10 Drawing Sheets

REMOVAL AND REPLACEMENT OF CONTAINER SHUTTLES FROM RAIL TRACKS

BACKGROUND

As users increasingly make online purchases, fulfillment of such purchases and other orders may become increasingly complicated. For example, a fulfillment center may have output of upwards of one million packages per day. With such demands, efficiency of logistics related to processing orders and packages may be important. For example, use of equipment to move or otherwise handle objects may improve efficiency. However, such equipment may create chokepoints or cause bottlenecks in fulfillment center operations. Accordingly, improvements in various operations and components of order fulfillment, such as improvements to picking technology, sorting technology, transport technology, packing technology, and so forth may be desired, such that manual efforts can be redirected to different tasks.

Figure 1:
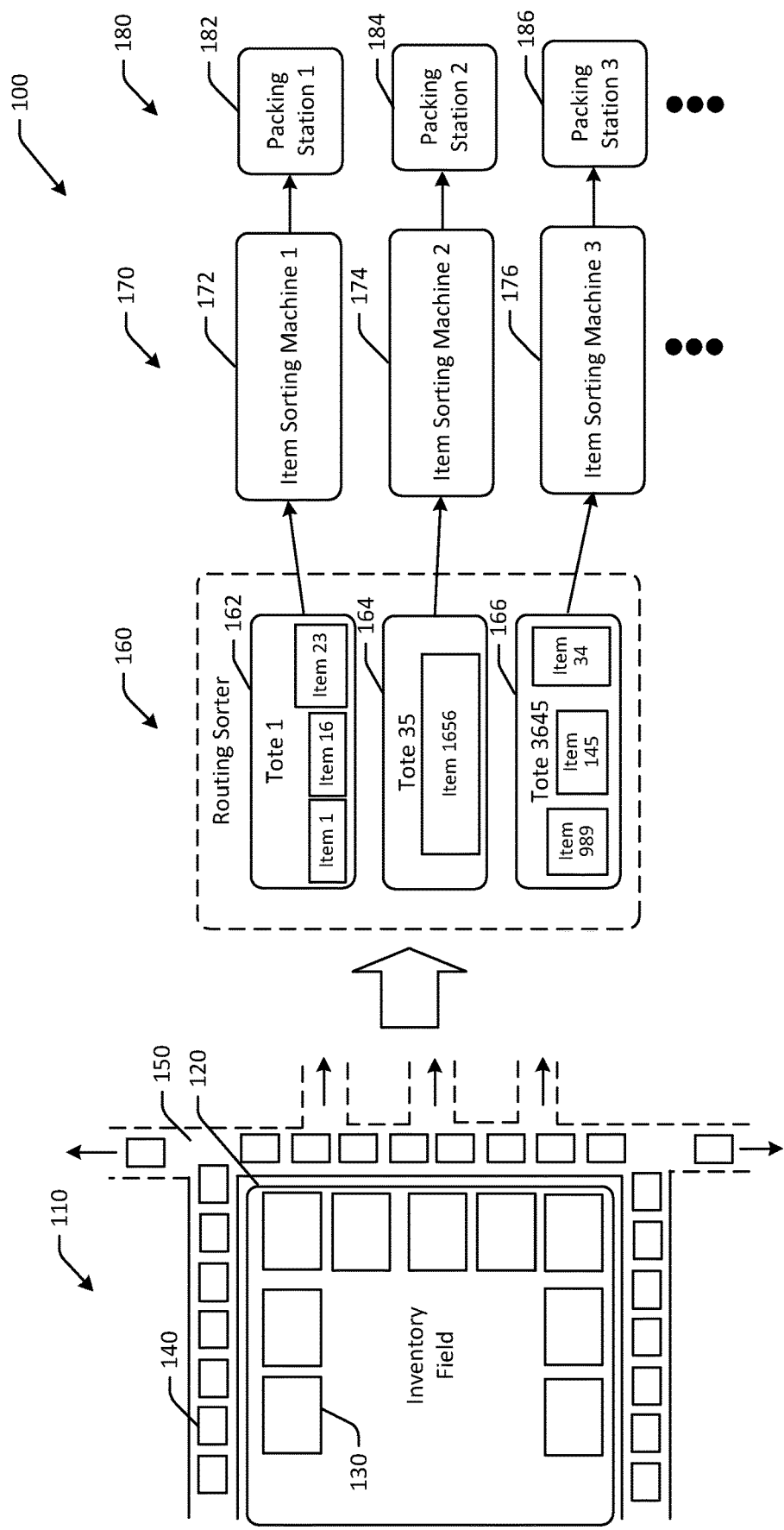
FIG. 1 is a hybrid schematic illustration of an example use case for removal and replacement of container shuttles from rail tracks in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. Humans may be able to manually handle individual items with ease. However, robotic handling of individual items may require various levels of dexterity. Moreover, fulfillment centers may include lengthy conveyors that may be used to transport objects, such as packages, products, items, or other objects, as well as containers that may be at least partially full of objects. Transport of containers or items (e.g., individual items or multiple items, etc.) may involve the use of container shuttles that move on one or more rails to transport a container from one location to another. For example, a container of items may be loaded onto a shuttle, and the shuttle may transport the container from an inventory field to a sortation system or other location. Shuttles may be used to transport containers and/or one or more items from a first location to a second location.

In a typical warehouse environment, such as that illustrated in FIG. 1, items may be transported through various means such as conveyors, belts, shuttles, etc. as they undergo different operations like picking, sorting, storing, shipping/dispatch, and so forth. In some of these cases, containers may be used to transport items, either individually or in groups, from one location to another. For instance, transporting items from a pick station to a sort station may involve the item(s) being picked into a container, such as a tote, which may then be transported via a shuttle.

Container shuttles may be in continuous operation and may move at relatively high speeds, such as speeds of three meters per second or more. As a result, container shuttles may require scheduled or unscheduled maintenance from time to time. For example, container shuttles may require preventative maintenance at scheduled intervals, or may require unscheduled maintenance in the event of a breakdown, etc. In instances where a container shuttle breaks down or experiences a malfunction that causes the shuttle to be unable to move, backups and traffic jams may occur due to the serial nature of shuttle rail tracks.

To service shuttles, the shuttles may have to be disengaged from the shuttle rail system and then removed from the shuttle rail system. For instance, certain shuttles may include one or more magnets, such as permanent magnets, underneath the shuttle that interact with electromagnets disposed along a set of rails. The permanent magnet and electromagnets may work together to form a linear induction motor that propels the shuttle. Because the shuttles may be propelled via electromagnetic propulsion, the shuttle may have to be disengaged from the shuttle rail system to avoid magnetic interaction before the shuttle can be removed from the shuttle rail system. Typically, shuttles may be removed from (and reintroduced to) shuttle rail systems at dedicated loading/unloading zones, as discussed with respect to FIGS. 4A-4B. However, moving inoperable shuttles to such zones may be difficult and time consuming, and may cause logjams for other shuttles along the shuttle rail system. In addition, if shuttles are not removed while maintain a uniform distance between the permanent magnet on the shuttle and the electromagnet along the rail track, the magnets may suddenly engage at one side of the shuttle, which could result in damage to the magnet(s), shuttle, track, or other components of the system.

To solve such issues, embodiments of the disclosure include shuttle disengagement mechanisms that allow for rapid removal and replacement of container shuttles from rail tracks without use of a dedicated shuttle loading/unloading zone. Some embodiments allow for parallel travel of a shuttle, and ensure no magnet contact in a linear synchronous motor arrangements. As a result, the risk of sudden magnetic engagement is removed and the shuttles can be quickly and safely removed from the rail tracks, and quickly and safely reintroduced to the rail tracks when ready. Embodiments include ramp-based shuttle disengagement systems that can be located at any location along the rail tracks, allowing for rapid removal of inoperable shuttles while minimizing downtime, as the shuttle may not have to be moved to a dedicated removal zone. Accordingly, embodiments may allow for removal and reintroduction of shuttles at any point along the rail tracks. As a result of the improve functionality provided by the shuttle disengagement mechanism design described herein, flexibility of the processing of items at the fulfillment center may be increased, such as by providing the ability to quickly remove shuttles anywhere along the rail tracks. Some embodiments include optimized process flows for processing of orders at fulfillment centers, as well as process flows or methods to increase speed of consolidating products in a multi-item order as a result of improved speed in transportation of items and/or containers. As a result, throughput of fulfillment centers may be improved, and/or logistics of fulfillment center operations may be less complicated.

Referring to FIG. 1, an example use case 100 for removal and replacement of container shuttles from rail tracks is depicted in accordance with one or more embodiments of the disclosure. Although discussed in the context of online orders, other embodiments may be directed to any suitable use case where containers or items are transported, such as instances where objects are picked from inventory, placed into containers, containers are transported, and so forth.

In FIG. 1, a fulfillment center may be a traditional fulfillment center and may include an inventory field 110, a routing sorter 160, one or more item sorting machines 170, and one or more packing stations 180. The inventory field 110 may include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include automated robotic arms, where the items are delivered to the picking stations 130 after being retrieved from the inventory field 110. Any number of picking stations 130 may be included, and the picking stations 130 may be located in a different position than that illustrated in FIG. 1.

In a traditional fulfillment center, such as that illustrated in FIG. 1, one or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more containers, such as totes 140. For example, as totes 140 move along the conveyors 150, items may be moved from the picking stations 130 into respective totes 140. The totes 140 may be associated with particular item sorting machines, and may be moved using the conveyors 150 to a routing sorter 160. In contrast, embodiments of the disclosure may not include some or all of the conveyors 150, and instead may include rails that may be used to guide shuttles from one location to another. The rails may be used with shuttle disengagement mechanisms that allow for removal and replacement of container shuttles from rail tracks.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may optionally guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of containers is used, shuttle disengagement systems as described herein may be used for removal and replacement of container shuttles from rail tracks.

Embodiments of the disclosure include systems and methods for removal and replacement of container shuttles from rail tracks. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
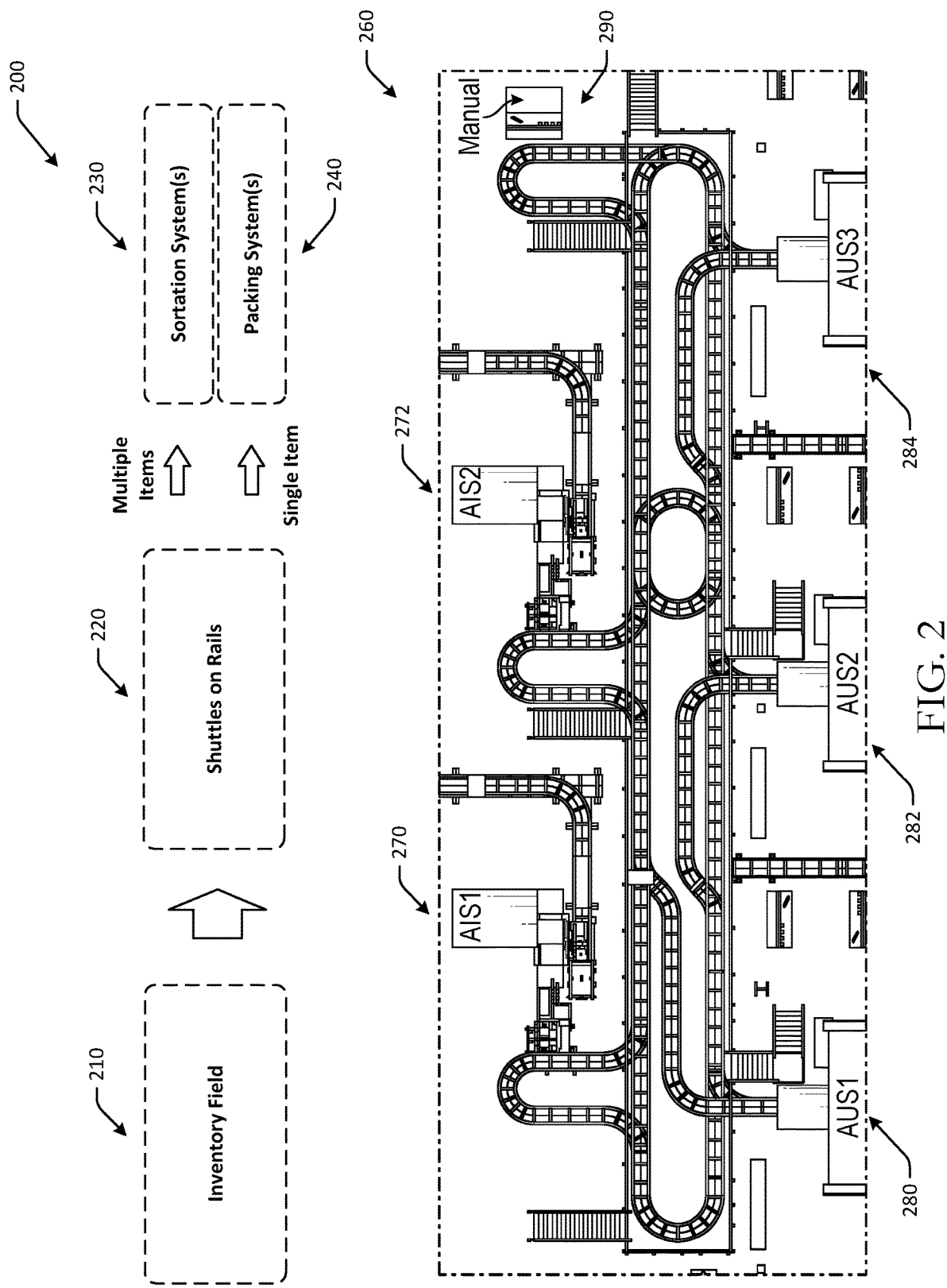
FIG. 2 is a schematic illustration of an example use case and facility layout for removal and replacement of container shuttles from rail tracks in accordance with one or more embodiments of the disclosure.

FIG. 2 is a schematic illustration of an example use case 200 and facility layout for removal and replacement of container shuttles from rail tracks in accordance with one or more embodiments of the disclosure. Other embodiments may include additional or fewer components. The illustration of FIG. 2 may not be to scale, and may not be illustrated to scale with respect to other figures.

In FIG. 2, a fulfillment center may include an inventory field 210, at which products or other items may be stored in inventory. As the items are ordered in online orders, the products may be picked from the inventory field 210 and routed for downstream processing in the fulfillment center. The items may be picked manually, using vehicles, or a combination thereof.

The picked products may be placed into one or more containers and the containers may be transported using one or more shuttles, such as one or more shuttles on rails 220. The shuttles on rails 220 may include container shuttles that are configured to transport items and/or containers from one location to another via rails. The rails may include switching rail components that allow for the shuttles to move from one set of rails to another. The shuttles on rails 220 may transport containers from the inventory field 210 to one or more downstream processes, such as a sortation system 230, or a packing system 240. For example, the sortation system 230 may be a system at which items picked from the inventory field 210 may be re-sorted into respective totes or other containers for particular orders. For example, items for different orders may be placed into containers that are transported by the shuttles on rails 220 from the inventory field 210. The containers may be sent to the sortation system 230 for sorting into particular orders. The packing system 240 may be a station at which one or more items associated with an order may be packed into a box or other container for shipment. A shipping label may be applied and the package may be dispatched to a loading dock or elsewhere for shipment. Other destinations or downstream processes in addition to, or instead of, the sortation systems and packing systems may be used.

A rail system 260 is depicted in schematic view in FIG. 2. The rail system 260 is an example of a network of rails that may be used by shuttles to transport containers from one location to another. The network of rails may include locations at which a shuttle can be directed to a straight path or to a loop, turn, oval, circle, and/or other geometries that involve a change in direction of a shuttle on the rails. Such changes in direction may be implemented using switching rail components. Shuttles can be removed from and/or reintroduced to the rail system 260 using the shuttle disengagement mechanisms described herein. The rail system 260 may include rails that link various systems, such as sortation systems, to each other and/or to other systems, such as container handling systems, manual induction systems 290, and so forth. For example, the rail system 290 may link a first sortation system 270 to a second sortation system 272, as well as to a first container handling system 280, a second container handling system 282, a third container handling system 284, and so forth. The rail system 260 may be used to connect any of the systems to each other and/or other systems.

Shuttles may move along the rails of the rail system 260. The shuttles may include linear drive motors or other drive components. Some drive components may provide a drive force via electromagnetism. As a result, one or more electromagnets may be disposed along the network of rails. Shuttles may optionally include a conveyor belt that may have a first set of one or more raised flaps and a second set of one or more raised flaps. The first set of raised flaps may form a first barrier along a first open-ended side of the shuttle, and the second set of raised flaps may form a second barrier along a second open-ended side of the shuttle to prevent items rolling off of the conveyor belt. The shuttles may include an on-board drive motor configured to move the conveyor belt in a forward direction and/or a reverse direction. The shuttles may include a magnet disposed on a lower surface of the shuttle. The magnet may be used to propel and/or secure the shuttle. For example, the magnet may prevent the shuttle from moving while the vehicle is in motion and the linear drive motor is engaged. To onboard or offload containers, the linear drive motor of the shuttle or other component may be used in conjunction with the magnet to impart motion.

Figure 3:
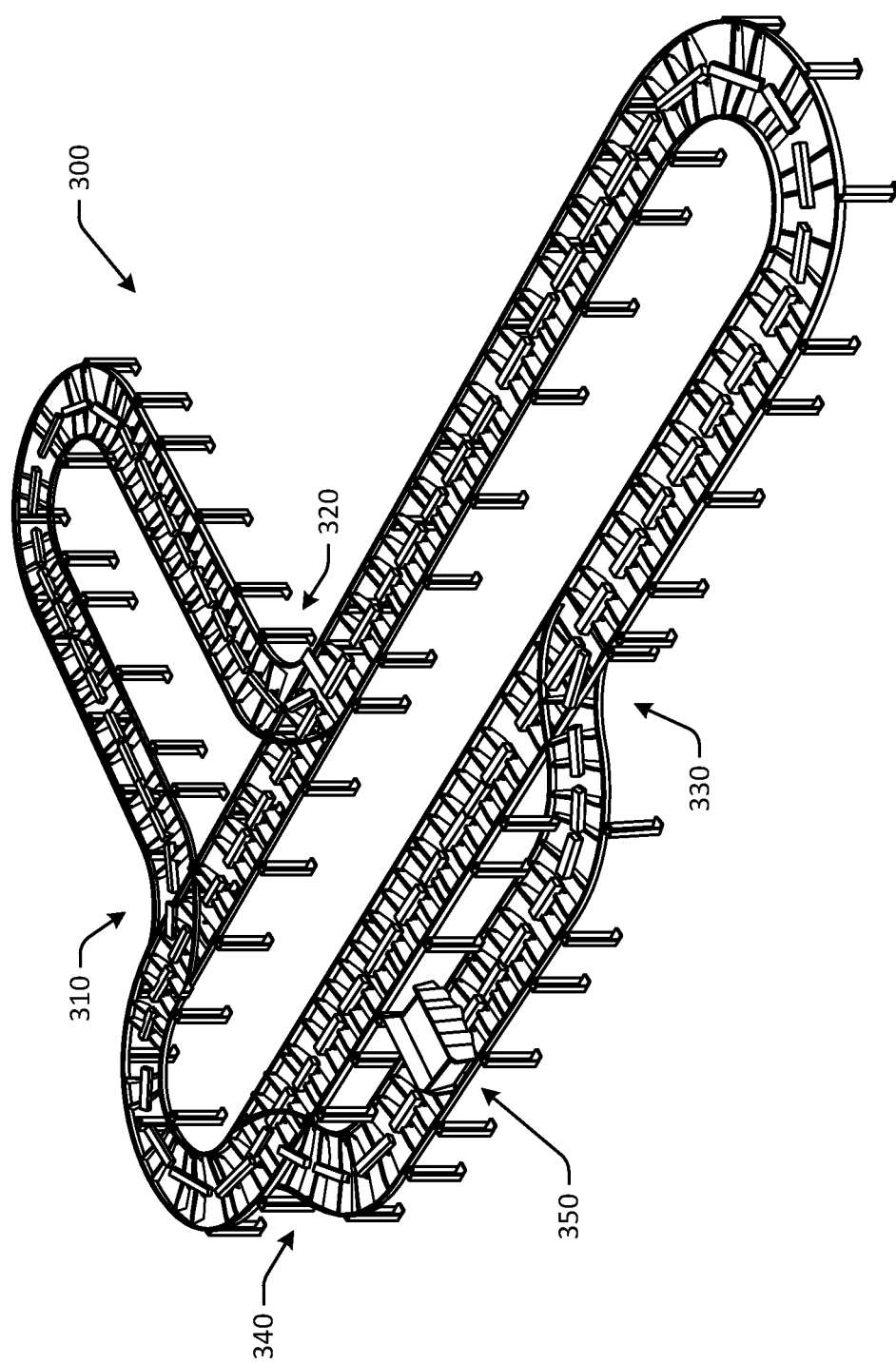
FIG. 3 is a schematic illustration of a perspective view of a shuttle rail system in accordance with one or more embodiments of the disclosure.

FIG. 3 is a schematic illustration of a perspective view of a shuttle rail system 300 in accordance with one or more embodiments of the disclosure. Other embodiments may include additional or fewer components. The illustration of FIG. 3 is not to scale, and may not be illustrated to scale with respect to other figures. The system illustrated in FIG. 3 may be used with the shuttle disengagement mechanisms described herein for removal and replacement of container shuttles from rail tracks discussed with respect to FIGS. 1-2, and/or may be used with any of the systems described herein.

The shuttle rail system 300 may be configured to provide continuous rail for switching the direction of a shuttle 350 in an electromagnetically propelled shuttle-on-rail arrangement. Shuttle-on-rail arrangements may be used in many systems, such as sortation systems, pick systems, delivery systems, etc. The shuttle rail system 300 may include rail switch mechanisms to allow the rail to be directed to alternate path. Shuttle-rail arrangements that are based on electromagnetic propulsion, such as linear drive motors, may have sets of electromagnets arranged along the direction of the rails. Shuttles may also have a magnet, such as a permanent magnet, coupled to a lower side of the shuttle. The electromagnet and the permanent magnet may have to be separated by a very narrow gap for optimal performance. Such factors may make removal of the shuttle 350 from the shuttle rail system 300 difficult, due to potential unintended interaction between the magnets. Embodiments of the disclosure include shuttle disengagement mechanisms that prevent unintended magnetic interaction for fast and safe removal and reintroduction of shuttles to the shuttle rail system 300.

Removal of the shuttle 350 from the shuttle rail system 300 at a curved section of rail may cause added difficulty. For example, the shuttle rail system 300 may include a first branched path 310, where if shuttles were moving along the shuttle rail system 300 in a clockwise direction, the shuttle could move in either a straight direction along the oval path of the shuttle rail system 300, or may make a left-handed curve onto a separate path of the shuttle rail system 300. Similarly, a second branched path 320 may allow for merging of shuttles that took a left curve at the first branched path 310 to merge back onto the oval path of the shuttle rail system 300. Any number of curved path and straight path intersections may be included in the shuttle rail system 300. For example, the shuttle rail system 300 may include a third branched path 330 and a fourth branched path 340. At any of the branched paths, the shuttle may be removed using the shuttle disengagement mechanisms described herein.

Figure 4A:
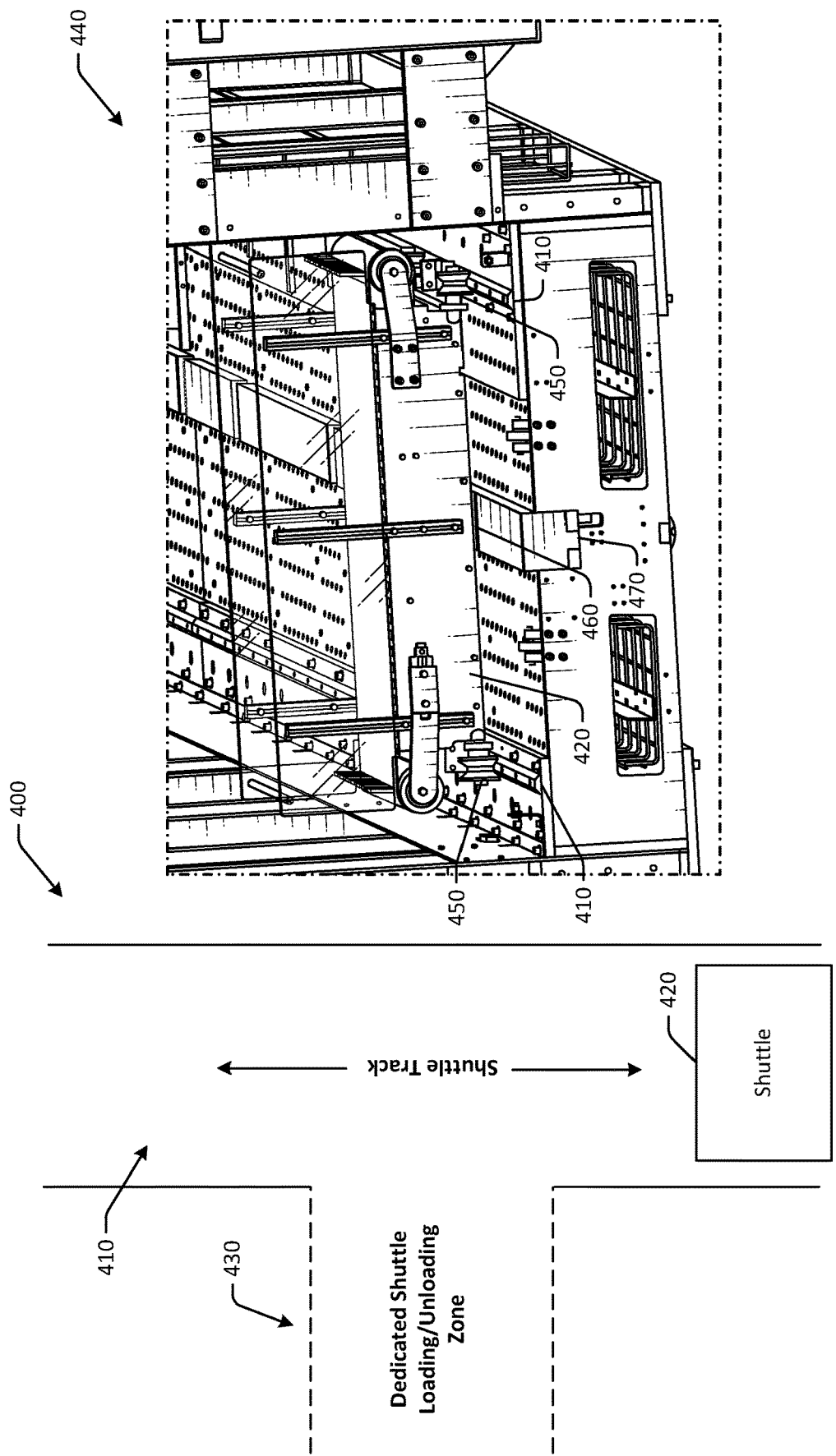
FIGS. 4A-4B are schematic illustrations of various views of portions of a shuttle rail system and a removal process for a container shuttle in accordance with one or more example embodiments of the disclosure.
Figure 4B:
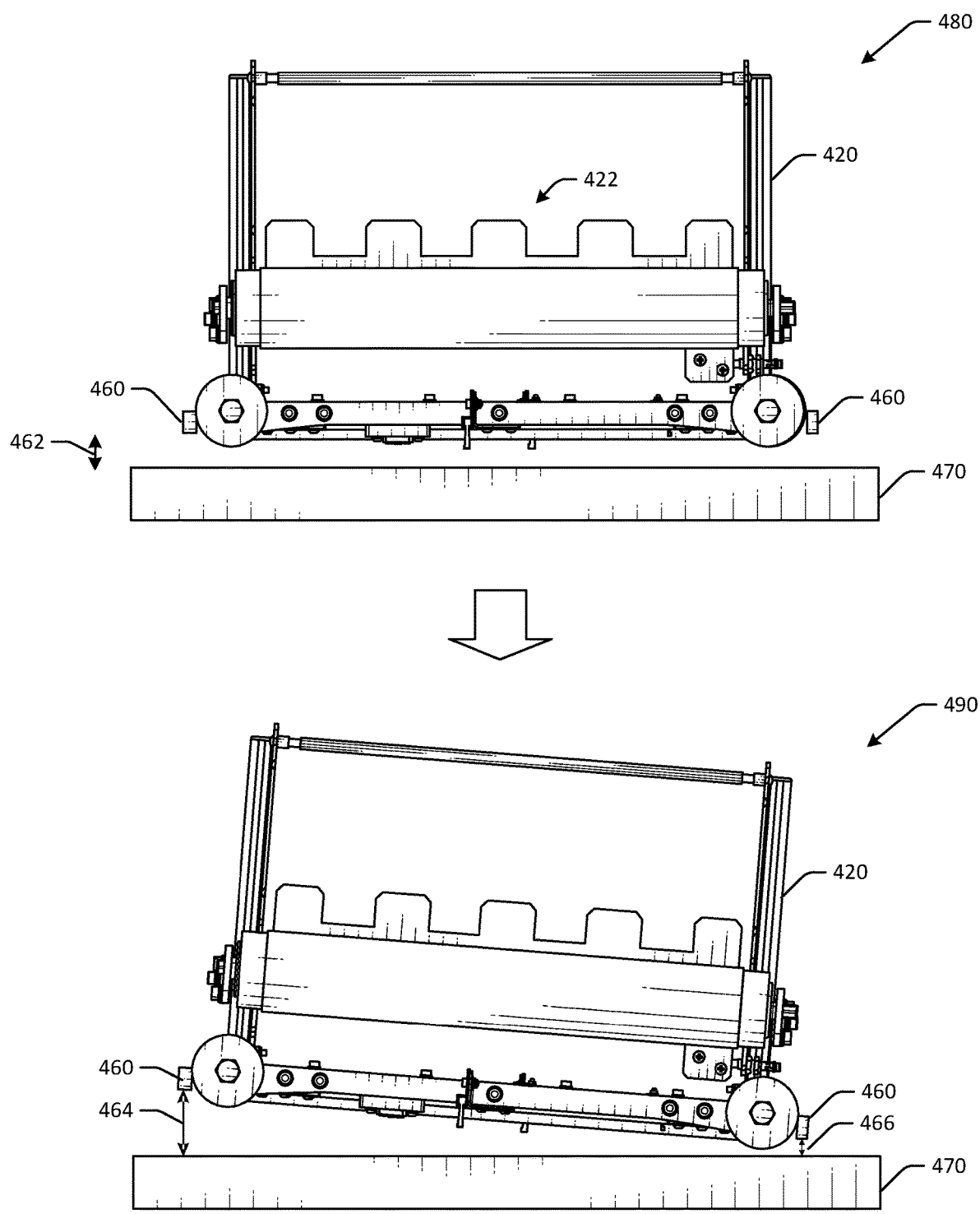

FIGS. 4A-4B depict various views of portions of a shuttle rail system 400 and a removal process for a container shuttle in accordance with one or more example embodiments of the disclosure. Other embodiments may include additional or fewer components. The illustration of FIGS. 4A-4B are not to scale, and may not be illustrated to scale with respect to other figures. The system illustrated in FIGS. 4A-4B may include the same shuttle and shuttle rail system discussed with respect to FIGS. 1-3.

FIG. 4A depicts a portion of the shuttle rail system 400 in a top schematic view. The shuttle rail system 400 may include one or more sets of rails 410 on which shuttles 420 may ride. The rails 410 may guide shuttles 420 to various locations. Each set of rails 410 may include two rails, so as to support two sides of a shuttle 420 on the rails. The shuttle rail system 400 may include a number of supports disposed between the two rails of a set of rails 410. A number of electromagnets 470 may optionally be disposed along the rails at various intervals. The electromagnets 470 may be configured to propel shuttles along the respective sets of rails.

Unlike typical shuttle rail systems, embodiments of the disclosure may remove the need for a dedicated shuttle loading/unloading zone 430. The dedicated shuttle loading/unloading zone 430 may be a section of shuttle track that does not include electromagnets 470 and may be at a dedicated inbound or outbound portion of the shuttle rail system 400. Because the shuttle disengagement mechanisms described herein allow for removal and reintroduction of shuttles anywhere along the shuttle rail system 400, the dedicated shuttle loading/unloading zone 430 may not be needed.

A perspective view 440 in FIG. 4A depicts the shuttle 420 engaged with the shuttle rail system 400. The shuttle 420 may include wheels 450 that engage the rails 410. Some embodiments may include four wheels 450, while other embodiments may include different numbers of wheels. Any suitable number and size of wheels may be used to engage with the rails 410.

The shuttle 420 may include a permanent magnet 460 disposed underneath the shuttle 420. The permanent magnet 460 may interact with the electromagnets 470 to electromagnetically propel the shuttle 420. The electromagnets 460 may therefore be a linear synchronous motor in some embodiments.

Although the shuttle 420 is depicted as traveling in a sideways configuration with respect to the shuttle rail system 400 (e.g., a payload on the shuttle 420 may be moving sideways with respect to the shuttle rail system 400, etc.), in other embodiments, the shuttle 420 may be oriented differently.

The shuttle rail system 400 may therefore include the set of rails 410 that form a track having a central axis. The set of rails 410 may include a first rail segment on a first side of the central axis and a second rail segment on a second side of the central axis. The shuttle rail system 400 may include the set of electromagnets 470 disposed along the central axis of the track. The shuttle rail system 400 may be used with the shuttles 420, where the shuttles 420 are configured to transport individual items or containers from a first location to a second location using the set of rails 410. The shuttle may include a first pair of wheels 450 disposed at a front end of the shuttle 420, and a second pair of wheels 450 disposed at a rear end of the shuttle 420. In some embodiments, the shuttle 420 may include a conveyor assembly having a central axis that is transverse to the central axis of the track, such as in the embodiment depicted in FIG. 4A. The shuttle 420 may include the permanent magnet 460 coupled to a lower surface of the shuttle 420. The permanent magnet 460 may be configured to engage with the set of electromagnets 470 to propel the shuttle 420.

In FIG. 4B, the shuttle 420 is depicted in an engaged state 480 with respect to the rails 410. For example, the shuttle 420 may be coupled to the rails 410 and ready for movement. The shuttle 420 may optionally include a conveyor belt 422 that may have a first set of one or more raised flaps and a second set of one or more raised flaps. The first set of raised flaps may form a first barrier along a first open-ended side of the shuttle 420, and the second set of raised flaps may form a second barrier along a second open-ended side of the shuttle 420 to prevent items rolling off of the conveyor belt.

In the engaged state 480, a vertical separation or vertical distance 462 between the permanent magnet 460 of the shuttle 420 and the electromagnet 470 coupled to the track may be uniform at both sides or at both ends of the shuttle 420. For example, during movement of the shuttle 420, the vertical distance 462 may be 0.005 inches. Because the vertical distance 462 is uniform, there may be uniform magnetic force between the permanent magnet 460 and the electromagnet 470. For example, the permanent magnet 460 may have a first end (e.g., at the left side of the page, etc.) and a second end (e.g., at the right side of the page, etc.). In some embodiments, such as that illustrated in FIG. 4B, the permanent magnet 460 may have a length that is greater than a length of the wheelbase of the shuttle 420, meaning that the permanent magnet 460 extends beyond the wheelbase of the shuttle 420 on one or both sides of the shuttle 420. In the engaged state 480, the first end and the second end of the permanent magnet 460 may be vertically separated from the electromagnet 470 by a uniform vertical distance 462.

However, during removal of the shuttle 420 without use of the shuttle disengagement mechanisms described herein, the shuttle 420 may become imbalanced, which may cause sudden magnetic interaction between a portion of the permanent magnet 460 and the electromagnet 470. For example, in a disengaged state 490, a first vertical distance 464 between the first end of the permanent magnet 460 and the electromagnet 470 may be greater than a second vertical distance 466 between the second end of the permanent magnet 460 and the electromagnet 470. This imbalance may cause exponentially higher electromagnetic force at the second end of the permanent magnet 460, which may result in sudden magnetic engagement of the permanent magnet 460 (at the second end) and the electromagnet 470, which may cause cracking of the magnet(s) due to impact force, damage to the track, damage to the shuttle, and so forth. In addition, once the permanent magnet 460 (at the second end) and the electromagnet 470 are in contact, separation of the magnets may be time consuming and difficult. Further, because the permanent magnet 460 may be a rare earth magnet (hence the pull force, irrespective of the electromagnet 470 being on or off) is large. When not handled properly the magnets may contact leading to damage due to impact and surfaces crushing into each other. Additionally, the magnetic forces are exponential order of distance hence, when stuck together require special implement to remove, leading to delay in normal operations and potential damage. Embodiments of the disclosure prevent such issues by providing shuttle disengagement mechanisms that provide uniform changes in vertical distance as the shuttle is removed from the track.

Figure 5:
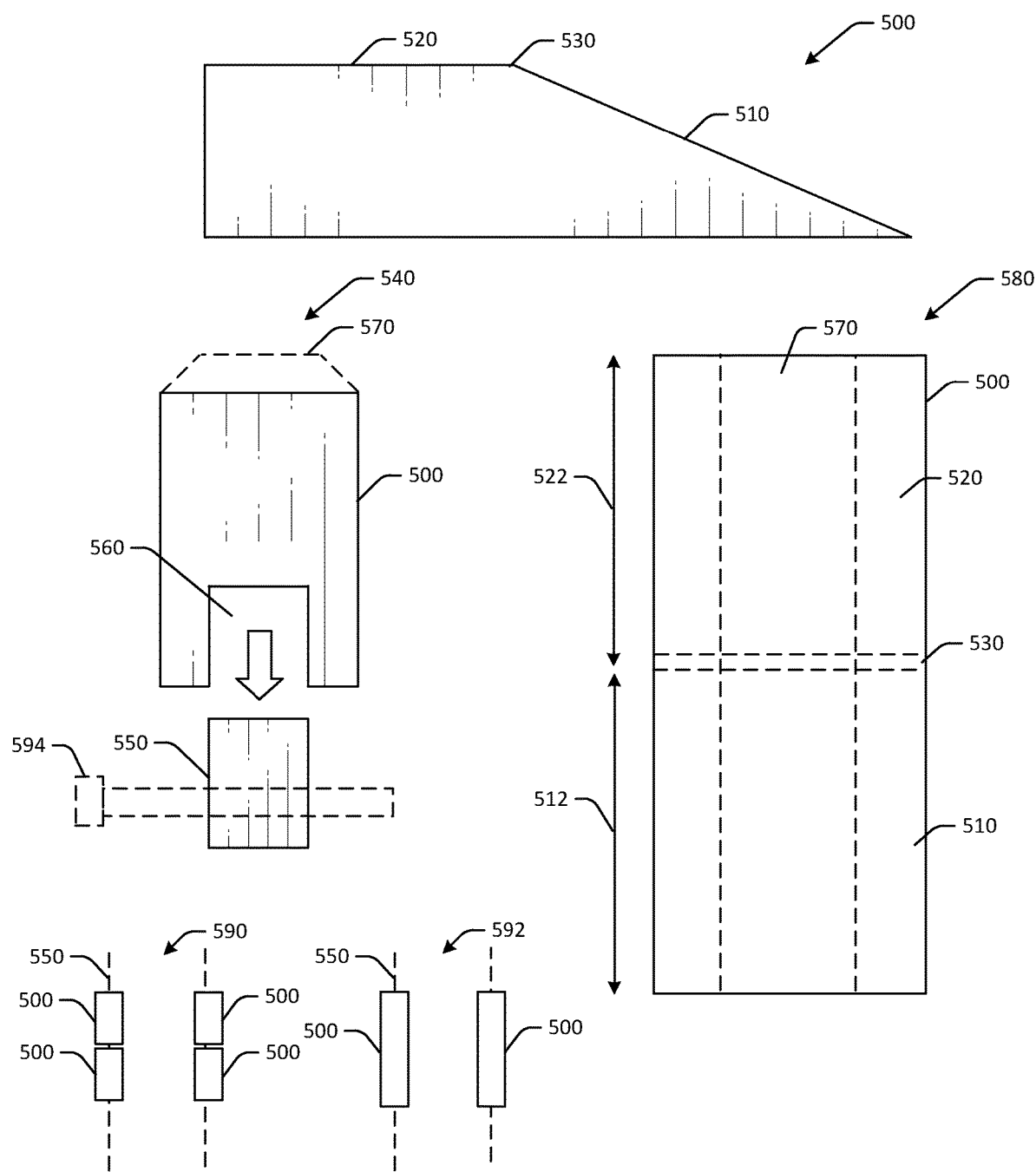
FIG. 5 is a schematic illustration of a shuttle disengagement mechanism in various views in accordance with one or more embodiments of the disclosure.

FIG. 5 depicts a shuttle disengagement mechanism 500 in various views in accordance with one or more embodiments of the disclosure. Other embodiments may include additional or fewer components. The illustration of FIG. 5 is not to scale, and may not be illustrated to scale with respect to other figures. The shuttle disengagement mechanism illustrated in FIG. 5 may be the same shuttle disengagement mechanism discussed with respect to FIGS. 1-4.

The shuttle disengagement mechanism 500 is depicted in side view in FIG. 5. The shuttle disengagement mechanism 500 may be a ramp-type of mechanism that can be coupled to a rail segment 550 of a shuttle track. Individual shuttle disengagement mechanisms 500 may be disposed adjacent to some or all of the wheels of the shuttle, and the shuttle may be manually pushed or automatically operated to move up the shuttle disengagement mechanism 500 while maintaining a uniform distance between the permanent magnet of the shuttle and the electromagnet disposed along the rail segment 550. The shuttle disengagement mechanism 500 may be formed of one or more non-magnetic materials, such as plastic, aluminum, rubber, composites, and/or other lightweight materials.

The shuttle disengagement mechanism 500 may include an angled portion 510, which may be an angled and/or wedge shaped portion of the shuttle disengagement mechanism 500. The angled portion 510 may be used to elevate the shuttle with respect to the rail segment 550. The shuttle disengagement mechanism 500 may include a plateau portion 520, which may be a flat portion on which the shuttle can rest when fully elevated with respect to the rail segment 550. The rail segment 550 may include a protrusion or detent feature 530 over which the shuttle may be pushed, so as to prevent the shuttle from unintentionally rolling from the plateau portion 520 to the angled portion 510. For example, the shuttle disengagement mechanism 500 may include a protrusion between the angled portion 510 and the plateau portion 520.

As depicted in front view 540, the shuttle disengagement mechanism 500 may include an optional wedged upper configuration 570. The wedged upper configuration 570 may be used to engage the wheels of the shuttle. For example, the shuttle disengagement mechanism 500 may have an upper configuration that matches that of the rail segment 550, such that the shuttle can seamlessly move onto the angled portion 510 of the shuttle disengagement mechanism 500. In some embodiments, regardless of the wedged upper configuration 570, the shuttle disengagement mechanism 500 may have a high friction material disposed on the respective angled portion 510 and/or plateau portion 520 to prevent unintentional movement of the shuttle.

The shuttle disengagement mechanism 500 may include an alignment feature 560, such as a cutout section, along a lower surface that allows the shuttle disengagement mechanism 500 to be coupled to the rail segment 550. In some embodiments, the rail segment 550 may also include an alignment feature that engages a corresponding alignment feature on the shuttle disengagement mechanism 500 to secure the shuttle disengagement mechanism 500 and to prevent movement of the shuttle disengagement mechanism 500 in a lateral direction and/or axially along the rail segment 550. For example, the rail segment 550 may include a cutout portion, and the shuttle disengagement mechanism 500 may include a protrusion that engages the cutout in the rail segment 550. However, such alignment features may reduce the number of locations along the track at which the shuttle disengagement mechanism 500 can be positioned. The alignment features, such as protrusions and corresponding cutouts, may define placement of the shuttle disengagement mechanisms 500 with respect to the first rail segment and the second rail segment of the track. In some embodiments, a securing mechanism 594, such as a pin, a bolt, a screw, a clamp, or other securing mechanism may be used to secure the shuttle disengagement mechanism 500 to the rail segment 550.

As depicted in top view 580, the shuttle disengagement mechanism 500 may include the optional wedged upper configuration 570 that may include a flat portion along a middle of the shuttle disengagement mechanism 500 and angled surfaces adjacent to both sides of the flat portion. The ramp portion 512 of the shuttle disengagement mechanism 500 may have a first length 512. The first length 512 may be different in different embodiments depending on the angle of the ramp. For example, the greater the angle of the angled portion 510, the shorter the first length 512 may be, but the more difficult removal of the shuttle may be. In contrast, the smaller the angle of the angled portion 510, the greater the first length 512 may be, and the less difficult removal of the shuttle may be. However, size restrictions with respect to the shuttle track may need to be considered when configuring the angle and the first length 512.

The plateau portion 520 may have a second length 522. The second length 522 may be equal to or greater than a length of the wheelbase of the shuttle, such that the shuttle can rest on the plateau portion 522 when fully disengaged from the track.

In some embodiments, one shuttle disengagement mechanism 500 may be used for each wheel of the shuttle. For example, in a first use case 590, a shuttle may have four wheels. Accordingly, four shuttle disengagement mechanisms 500 may be coupled to the track adjacent to each of the wheels. The shuttle may then be pushed up the four shuttle disengagement mechanisms 500 simultaneously. In other embodiments, the shuttle disengagement mechanism 500 may include two angled portions 510 and two plateau portions, so a total of two shuttle disengagement mechanisms 500 may be used for a shuttle with four wheels.

In a second use case 592, the angle of the angled portion 510 may be relatively small, such as about 25-35 degrees. The first length 512 may be relatively longer than that of the first use case 590. Two shuttle disengagement mechanisms 500 may be used regardless of the number of wheels of the shuttle, where one shuttle disengagement mechanism 500 is coupled to each side of the track. The shuttle disengagement mechanisms 500 may be positioned adjacent to the front wheels at both sides of the track, and the shuttle may be pushed up the respective angled portions 510. However, due to the small angle, the vertical distance between a front end and rear end of the permanent magnet may remain substantially uniform (e.g., within 5%, etc.) so as to avoid problematic issues.

Accordingly, some embodiments may include a first shuttle disengagement mechanism, which may be a first ramp, coupled to the first rail segment adjacent to a first wheel of a front pair of wheels of a shuttle. The first ramp may include an angled portion and a plateau portion. The system may include a second shuttle disengagement mechanism, which may be a second ramp, coupled to the first rail segment adjacent to a first wheel of the rear pair of wheels of the shuttle. The second ramp may include the angled portion and the plateau portion. The system may include a third shuttle disengagement mechanism, which may be a third ramp, coupled to the second rail segment adjacent to a second wheel of the front pair of wheels. The third ramp may include the angled portion and the plateau portion. The system may include a fourth shuttle disengagement mechanism, which may be a fourth ramp, coupled to the second rail segment adjacent to a second wheel of the rear pair of wheels. The fourth ramp may include the angled portion and the plateau portion. The shuttle may be configured to be moved up the respective angled portions of the first ramp, second ramp, third ramp, and fourth ramp onto the respective plateau portions while maintaining the uniform vertical distance between the first end and the second end of the permanent magnet and the electromagnet.

Figure 6A:
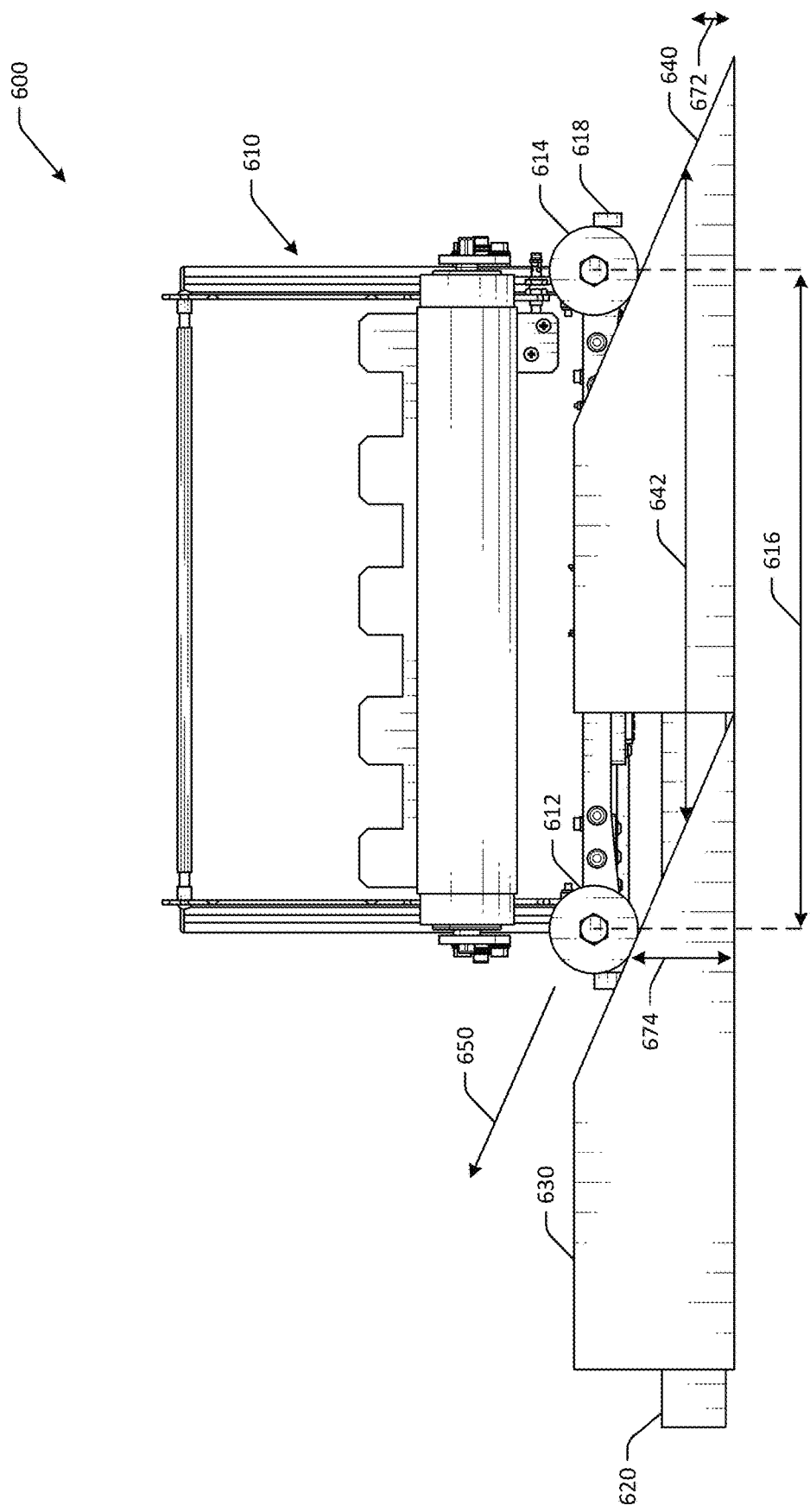
FIGS. 6A-6B are schematic illustrations of a shuttle during a removal process using a shuttle disengagement mechanism in accordance with one or more embodiments of the disclosure.
Figure 6B:
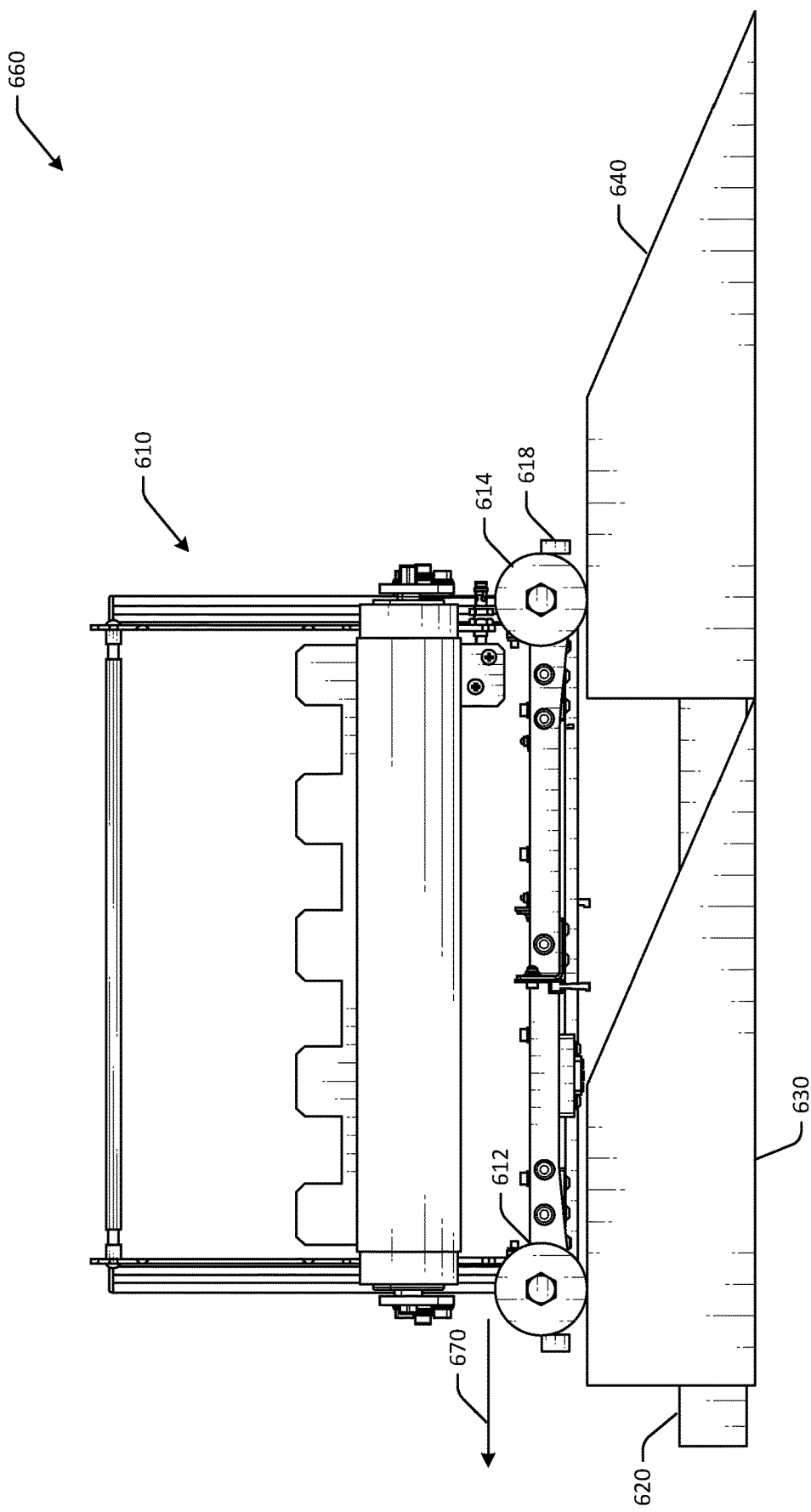

FIGS. 6A-6B are schematic illustrations of a shuttle during a removal process using a shuttle disengagement mechanism in accordance with one or more embodiments of the disclosure. Other embodiments may include additional or fewer components. The illustrations of FIGS. 6A-6B are not to scale, and may not be illustrated to scale with respect to other figures. The shuttle disengagement mechanism illustrated in FIGS. 6A-6B may be the same shuttle disengagement mechanisms discussed with respect to FIGS. 1-5.

In FIG. 6A, a shuttle 610 is depicted in a partially disengaged state 600. The shuttle 610 may be elevated with respect to a track 620 using one or more shuttle disengagement mechanisms. For example, a first shuttle disengagement mechanism 630 may be disposed adjacent to a front wheel 612 of the shuttle 610. A second shuttle disengagement mechanism 640 may be disposed adjacent to a rear wheel 614 of the shuttle 610. The shuttle 610 may be moved in direction 650 up both the first shuttle disengagement mechanism 630 and the second shuttle disengagement mechanism 640 simultaneously, such that a distance 674 between a permanent magnet 618 of the shuttle 610 and an electromagnet disposed along the track 620 increases uniformly, such that the distance 674 is equal to or greater than a first vertical distance 672 as the shuttle 610 moves upwards along the ramp(s). To ensure uniform movement, a first pitch 616 between the wheels of the shuttle 610 may be equal to a second pitch 642 between the first shuttle disengagement mechanism 630 and the second shuttle disengagement mechanism 640.

During normal use of the shuttle 610, the two magnets may be parallel, and the wheelbase and engagement of the chassis of the shuttle 610 ensures that the spacing between the two magnets stays consistent. However, in scenarios such as introduction of a new shuttle and/or removal of a shuttle for maintenance and traffic management, the removal of shuttle can be performed using the shuttle disengagement mechanisms, such that the space between the two magnets is increased gradually. The shuttle disengagement mechanism may be coupled to the track 620 at a pitch matching that of the shuttle wheels. As the shuttle 610 moves towards the plateau portion of the shuttle disengagement mechanisms, the magnetic force reduces gradually as the shuttle climbs. During the climb, the two magnets remain parallel.

In FIG. 6B, the shuttle 610 is depicted in a disengaged state 660 at the plateau portions of the respective first shuttle disengagement mechanism 630 and the second shuttle disengagement mechanism 640. Once the shuttle 610 is positioned at the plateau portions of the first shuttle disengagement mechanism 630 and the second shuttle disengagement mechanism 640, the shuttle 610 may be pushed in direction 670 to secure the shuttle 610 at ends of the first shuttle disengagement mechanism 630 and the second shuttle disengagement mechanism 640. Once the shuttle 610 is fully positioned on the plateau portions, the magnetic force may be minimal and the shuttle 610 may be fully disengaged. The shuttle 610 may be manually lifted and removed from the system.

When reintroducing the shuttle 610 to the system, the shuttle 610 may be placed on the respective plateau portions of the first shuttle disengagement mechanism 630 and the second shuttle disengagement mechanism 640, and may be gradually pushed down the angled portions of the first shuttle disengagement mechanism 630 and the second shuttle disengagement mechanism 640. Once the wheels of the shuttle 610 make contact with the rails of the track 620, the shuttle 610 may be fully engaged and activated. As the shuttle 610 moves down the angled portions, the magnetic force gradually increases and the two magnets stay parallel.

Embodiments may therefore include a system for a shuttle that may be coupled to a permanent magnet. The system may include the track 620 include a first rail segment and a second rail segment, and an electromagnet disposed along the track 620. The permanent magnet may be separated from the electromagnet by a first vertical distance when the shuttle is coupled to the track 620. The system may include a first shuttle disengagement mechanism 630, which may be a first ramp, that includes a first angled portion and a first flat portion. The first ramp may be configured to be removably coupled to the first rail segment. The system may include a second shuttle disengagement mechanism, which may be a second ramp, having a second angled portion and a second flat portion, where the second ramp may be configured to be removably coupled to the second rail segment. The shuttle may be configured to move upwards along the first ramp and the second ramp. A vertical distance between the permanent magnet and the electromagnet may be equal to or greater than the first vertical distance as the shuttle moves upwards along the first ramp and the second ramp. Some embodiments may include a third shuttle disengagement mechanism, which may be a third ramp, having a third angled portion and a third flat portion. The third ramp may be configured to be removably coupled to the first rail segment. The system may include a fourth shuttle disengagement mechanism, which may be a fourth ramp, having a fourth angled portion and a fourth flat portion. The fourth ramp may be configured to be removably coupled to the second rail segment. The shuttle may include any number of wheels, such as a first wheel, a second wheel, a third wheel, and a fourth wheel, where the first ramp is disposed adjacent to the first wheel, the second ramp is disposed adjacent to the second wheel, the third ramp is disposed adjacent to the third wheel, and the fourth ramp is disposed adjacent to the fourth wheel. A wheelbase of the shuttle may have a first length, and the first flat portion and the second flat portion have a second length that is equal to or greater than the first length. As a result, the entire shuttle can be supported by the flat portions of the shuttle disengagement mechanisms. The shuttle may be configured to be moved up the respective angled portions of the first ramp, second ramp, third ramp, and fourth ramp onto the respective plateau portions while maintaining the uniform vertical distance between the first end and the second end of the permanent magnet and the electromagnet.

Figure 7:
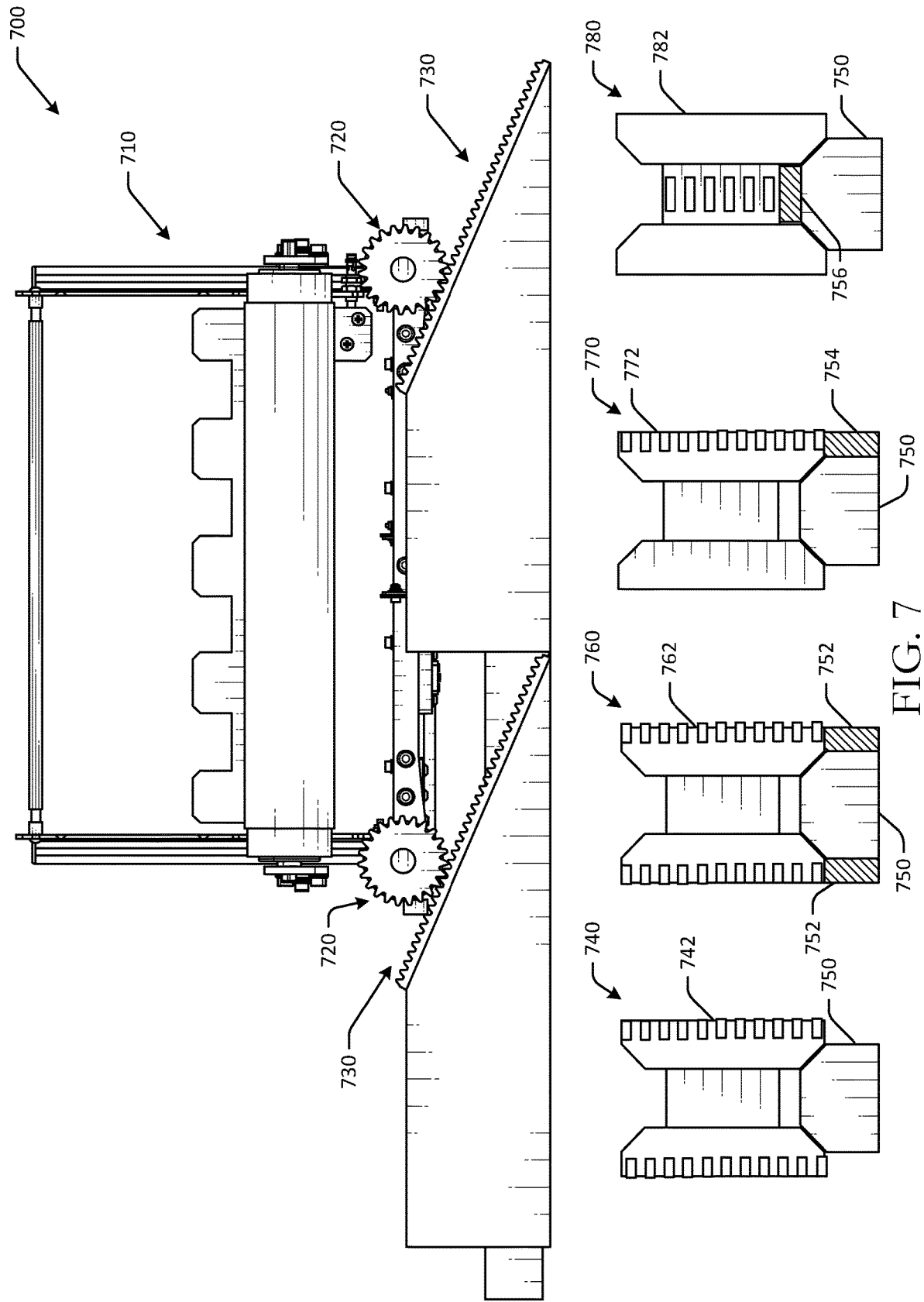
FIG. 7 is a schematic illustration of a shuttle during a removal process using a shuttle disengagement mechanism having various traction features in accordance with one or more embodiments of the disclosure.

FIG. 7 is a schematic illustration of a shuttle during a removal process using a shuttle disengagement mechanism having various traction features in accordance with one or more embodiments of the disclosure. Other embodiments may include additional or fewer components. The illustration of FIG. 7 is not to scale, and may not be illustrated to scale with respect to other figures. The shuttle disengagement mechanism illustrated in FIG. 7 may be the same shuttle disengagement mechanisms discussed with respect to FIGS. 1-6B.

In order to ensure that shuttle wheels maintain any required pitch and no slippage happens, some embodiments of the shuttle disengagement mechanism may include traction features. As the shuttle moves along the shuttle disengagement mechanism, the traction features may prevent slippage.

In FIG. 7, a shuttle 710 is depicted in a partially disengaged state 700. The shuttle 710 may be moving up two shuttle disengagement mechanisms. The shuttle disengagement mechanisms may include traction features. For example, the shuttle disengagement mechanisms may include racks 730 that engage pinion features 720 that may be disposed on wheels of the shuttle 710. In an embodiment, the shuttle wheels may individually include first gear teeth forming respective pinions. The pinions may engage second gear teeth forming a rack along the respective angled portions of the shuttle disengagement mechanisms. The pinions may be configured to engage the rack as the shuttle moves up the respective angled portions of the shuttle disengagement mechanisms.

Any suitable arrangement of rack and pinion systems or other traction systems may be used. For example, in a first embodiment 740, a default configuration of a shuttle wheel 742 engaged with a shuttle disengagement mechanism surface 750 is depicted. The traction feature of the first embodiment 740 may be the wedge shaped upper portion of the shuttle disengagement mechanism, which may have a high friction material.

In a second embodiment 760, a rack 752 may be coupled to or integrated on both sides of the shuttle disengagement mechanism, where the rack 752 may engage a pinion or teeth 762 on both sides of the shuttle wheel flange. In a third embodiment 770, a rack 754 may be coupled to or integrated on one side of the shuttle disengagement mechanism, where the rack 754 may engage a pinion or teeth 772 on one side of the shuttle wheel flange. In a fourth embodiment 780, a rack 756 may be coupled to or integrated on an upper side of the shuttle disengagement mechanism, where the rack 756 may engage a pinion or teeth 772 that may be disposed along an interior portion of the wheel 782. Any suitable combination or arrangement of traction features may be used. The traction features may further ensure that a pitch between the wheels while engaging the ramps stays consistent as a result of the geometry of the rack and pinion systems or other traction features.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
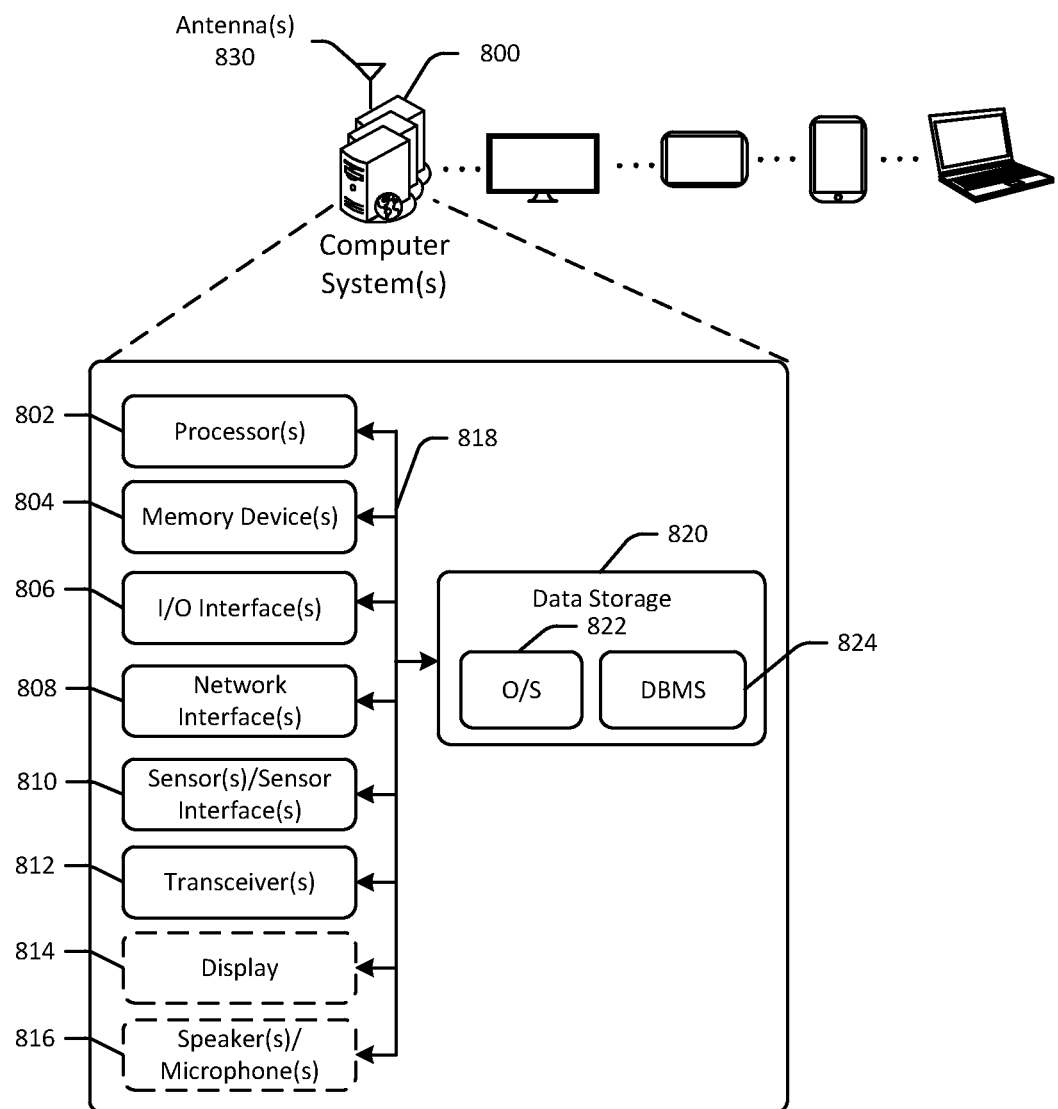
FIG. 8 schematically illustrates an example architecture of a computer system associated with a shuttle rail system in accordance with one or more embodiments of the disclosure.

FIG. 8 is a schematic block diagram of one or more illustrative computer system(s) 800 associated with a shuttle rail system in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for the controller(s) of FIGS. 1-7. For example, the computer system(s) 800 may be a controller and may control one or more aspects of the removal and replacement of container shuttles from rail tracks described in FIGS. 1-7.

The computer system(s) 800 may be configured to communicate with one or more servers, user devices, or the like. The computer system(s) 800 may be configured to control rail switches, identify shuttles, direct shuttles, move shuttles, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antenna(s) may include directional antenna(s), non-directional antenna(s), dipole antenna(s), folded dipole antenna(s), patch antenna(s), multiple-input multiple-output (MIMO) antenna(s), or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that That which is claimed is:

1. A system comprising:
a set of rails that form a track having a central axis, the set of rails comprising a first rail segment on a first side of the central axis and a second rail segment on a second side of the central axis;
a set of electromagnets disposed along the central axis of the track;
a shuttle configured to transport individual items from a first location to a second location using the set of rails, the shuttle comprising:
a first pair of wheels disposed at a front end of the shuttle;
a second pair of wheels disposed at a rear end of the shuttle;
a conveyor assembly having a central axis that is transverse to the central axis of the track; and
a permanent magnet coupled to a lower surface of the shuttle, the permanent magnet configured to engage with the set of electromagnets to propel the shuttle, wherein the permanent magnet comprises a first end and a second end, and wherein the first end and the second end are vertically separated from an electromagnet of the set of electromagnets by a uniform vertical distance;
a first ramp coupled to the first rail segment adjacent to a first wheel of the first pair of wheels, the first ramp comprising an angled portion and a plateau portion;
a second ramp coupled to the first rail segment adjacent to a first wheel of the second pair of wheels, the second ramp comprising the angled portion and the plateau portion;
a third ramp coupled to the second rail segment adjacent to a second wheel of the first pair of wheels, the third ramp comprising the angled portion and the plateau portion; and
a fourth ramp coupled to the second rail segment adjacent to a second wheel of the second pair of wheels, the fourth ramp comprising the angled portion and the plateau portion;
wherein the shuttle is configured to be simultaneously moved up the respective angled portions of the first ramp, second ramp, third ramp, and fourth ramp via the respective pairs of wheels onto the respective plateau portions while maintaining the uniform vertical distance between the first end and the second end of the permanent magnet and the electromagnet.

2. The system of claim 1, wherein the first pair of wheels and the second pair of wheels individually comprise first gear teeth forming a pinion; and
wherein the first ramp, second ramp, third ramp, and fourth ramp individually comprise second gear teeth forming a rack along the respective angled portions, wherein the pinions are configured to engage the rack as the shuttle moves up the respective angled portions of the ramps.

3. The system of claim 1, wherein the second pair of wheels are separated from the first pair of wheels by a first pitch; and
wherein a second pitch between the first ramp and the second ramp is equal to the first pitch, and a third pitch between the third ramp and the fourth ramp is equal to the first pitch.

4. The system of claim 1, wherein the first rail segment and the second rail segment comprise respective cutout portions; and
wherein the first ramp, second ramp, third ramp, and fourth ramp individually comprise protrusions configured to engage the respective cutout portion to define placement of the first ramp, second ramp, third ramp, and fourth ramp with respect to the first rail segment and the second rail segment.

5. A system for a shuttle coupled to a permanent magnet, the system comprising:
a track comprising a first rail segment and a second rail segment;
an electromagnet disposed along the track, wherein the permanent magnet is separated from the electromagnet by a first vertical distance when the shuttle is coupled to the track;
a first ramp comprising a first angled portion and a first flat portion, the first ramp configured to be removably coupled to the first rail segment; and
a second ramp comprising a second angled portion and a second flat portion, the second ramp configured to be removably coupled to the second rail segment;
wherein the shuttle is configured to move upwards along the first ramp and the second ramp simultaneously via shuttle wheels, and wherein a vertical distance between the permanent magnet and the electromagnet is equal to or greater than the first vertical distance as the shuttle moves upwards along the first ramp and the second ramp.

6. The system of claim 5, wherein a wheelbase of the shuttle has a first length, and wherein the first flat portion and the second flat portion have a second length that is equal to or greater than the first length.

7. The system of claim 5, further comprising:
a third ramp comprising a third angled portion and a third flat portion, the third ramp configured to be removably coupled to the first rail segment; and
a fourth ramp comprising a fourth angled portion and a fourth flat portion, the fourth ramp configured to be removably coupled to the second rail segment;
wherein the shuttle comprises a first wheel, a second wheel, a third wheel, and a fourth wheel, and wherein the first ramp is disposed adjacent to the first wheel, the second ramp is disposed adjacent to the second wheel, the third ramp is disposed adjacent to the third wheel, and the fourth ramp is disposed adjacent to the fourth wheel, such that the wheels move along the respective ramps simultaneously.

8. The system of claim 7, wherein a first pitch between the first wheel and the second wheel is equal to a second pitch between the first ramp and the third ramp.

9. The system of claim 7, wherein a wheelbase of the shuttle has a first length, and wherein the permanent magnet has a second length that is greater than the first length.

10. The system of claim 5, wherein the first ramp and the second ramp are both formed of non-magnetic materials.

11. The system of claim 5, wherein the shuttle comprises a first wheel having first gear teeth, and a second wheel having second gear teeth, and wherein the first ramp further comprises a first rack disposed along the first angled portion configured to engage the first gear teeth, and the second ramp further comprises a second rack disposed along the second angled portion configured to engage the second gear teeth.

12. The system of claim 11, wherein the first gear teeth are disposed along an interior portion of the first wheel, and the second gear teeth are disposed along an interior portion of the second wheel.

13. The system of claim 5, wherein the first ramp and the second ramp further comprise:
a high friction material disposed on the respective first angled portion and the second angled portion.

14. The system of claim 5, wherein the first rail segment comprises a first cutout portion, and the second rail segment comprises a second cutout portion; and
wherein the first ramp further comprises a first protrusion configured to engage the first cutout portion, and the second ramp further comprises a second protrusion configured to engage the second cutout portion.

15. The system of claim 5, wherein the first ramp further comprises a first protrusion between the first angled portion and the first flat portion, and the second ramp further comprises a second protrusion between the second angled portion and the second flat portion.

16. A system comprising:
a shuttle coupled to a permanent magnet;
a first rail segment;
a second rail segment;
an electromagnet disposed between the first rail segment and the second rail segment, wherein the permanent magnet is separated from the electromagnet by a first vertical distance when the shuttle is coupled to the first rail segment and the second rail segment;
a first ramp comprising a first angled portion and a first flat portion; and
a second ramp comprising a second angled portion and a second flat portion;
wherein the shuttle is configured to move upwards along the first ramp and the second ramp simultaneously via shuttle wheels, and wherein a vertical distance between the permanent magnet and the electromagnet is equal to or greater than the first vertical distance as the shuttle moves upwards along the first ramp and the second ramp.

17. The system of claim 16, wherein the first ramp is configured to be removably coupled to the first rail segment, and the second ramp is configured to be removably coupled to the second rail segment.

18. The system of claim 16, wherein a wheelbase of the shuttle has a first length, and wherein the first flat portion and the second flat portion have a second length that is equal to or greater than the first length.

19. The system of claim 16, further comprising:
a third ramp comprising a third angled portion and a third flat portion; and
a fourth ramp comprising a fourth angled portion and a fourth flat portion;
wherein the shuttle comprises a first wheel, a second wheel, a third wheel, and a fourth wheel, and wherein the first ramp is disposed adjacent to the first wheel, the second ramp is disposed adjacent to the second wheel, the third ramp is disposed adjacent to the third wheel, and the fourth ramp is disposed adjacent to the fourth wheel, such that the wheels move along the respective ramps simultaneously.

20. The system of claim 16, wherein the shuttle further comprises:
a first wheel having first gear teeth; and
a second wheel having second gear teeth;
wherein the first ramp further comprises a first rack disposed along the first angled portion configured to engage the first gear teeth, and the second ramp further comprises a second rack disposed along the second angled portion configured to engage the second gear teeth.

\* \* \* \* \*